United States Patent [19]

Wolters et al.

[11] Patent Number: 4,505,875

[45] Date of Patent: Mar. 19, 1985

[54] COOLANT STANDPIPE SYSTEM FOR PROTECTION OF A NUCLEAR REACTORS SAFETY VESSEL AGAINST BREAKDOWN FROM OVERPRESSURE

[75] Inventors: Johannes Wolters, Duren; Paul-Johannes David, Inden; Monika Heller, Duren, all of Fed. Rep. of Germany

[73] Assignee: Kernforschungsanlage Jülich GmbH, Jülich, Fed. Rep. of Germany

[21] Appl. No.: 304,926

[22] Filed: Sep. 23, 1981

[30] Foreign Application Priority Data

Oct. 3, 1980 [DE] Fed. Rep. of Germany ....... 3037468

[51] Int. Cl.³ .......................... G21C 9/00; G21C 19/20
[52] U.S. Cl. .................................... 376/283; 376/293; 376/298
[58] Field of Search ................. 376/283, 293, 313, 298

[56] References Cited

U.S. PATENT DOCUMENTS

| | | | |
|---|---|---|---|
| 3,115,450 | 12/1963 | Schanz | 376/283 |
| 3,168,445 | 2/1965 | Ziegler et al. | 376/283 |
| 3,379,613 | 4/1968 | Tagami et al. | 376/293 |
| 3,454,466 | 7/1969 | Pitt et al. | 376/283 |
| 4,022,655 | 5/1977 | Gauditz et al. | 376/283 |
| 4,056,436 | 11/1977 | Bukrinsky et al. | 376/283 |
| 4,151,689 | 5/1979 | Schabert | 376/283 |
| 4,243,485 | 1/1981 | Chabin | 376/313 |
| 4,297,167 | 10/1981 | Schabert | 376/283 |
| 4,362,693 | 12/1982 | Bukrinsky et al. | 376/283 |

FOREIGN PATENT DOCUMENTS

| | | |
|---|---|---|
| 1089083 | 9/1960 | Fed. Rep. of Germany . |
| 1227577 | 12/1964 | Fed. Rep. of Germany . |
| 927095 | 5/1960 | United Kingdom . |
| 1011137 | 11/1965 | United Kingdom . |
| 1044405 | 9/1966 | United Kingdom . |
| 1198090 | 7/1970 | United Kingdom . |
| 1376384 | 12/1974 | United Kingdom . |
| 1463148 | 2/1977 | United Kingdom . |
| 1516416 | 7/1978 | United Kingdom . |
| 1549475 | 8/1979 | United Kingdom . |
| 1549967 | 8/1979 | United Kingdom . |
| 1280400 | 7/1982 | United Kingdom . |

*Primary Examiner*—Sal Cangialosi
*Attorney, Agent, or Firm*—Frishauf, Holtz, Goodman & Woodward

[57] ABSTRACT

A standpipe runs up from a liquid storage vessel located between the safety vessel of a nuclear reactor and the safety enclosure around it and connected by a pressure equalization line to the interior space of the safety vessel. Undesired pressure increases in the interior of the safety vessel are absorbed by pushing water out of the storage vessel up the standpipe to a discharge above the safety vessel which is still within the safety enclosure. With sufficient pressure, the liquid, which may be conveniently water, flows from the standpipe to an overflow collar at the top of the safety vessel from which it runs down over the surface of that vessel to cool it. Water that evaporates is collected on the interior wall of the safety enclosure and also percolates down to the base of the safety enclosure, from which it is pumped back to the overflow collar, from which it can flow back into the pressure vessel when the pressure inside the safety vessel of the reactor goes back to normal.

11 Claims, 1 Drawing Figure

U.S. Patent   Mar. 19, 1985   4,505,875
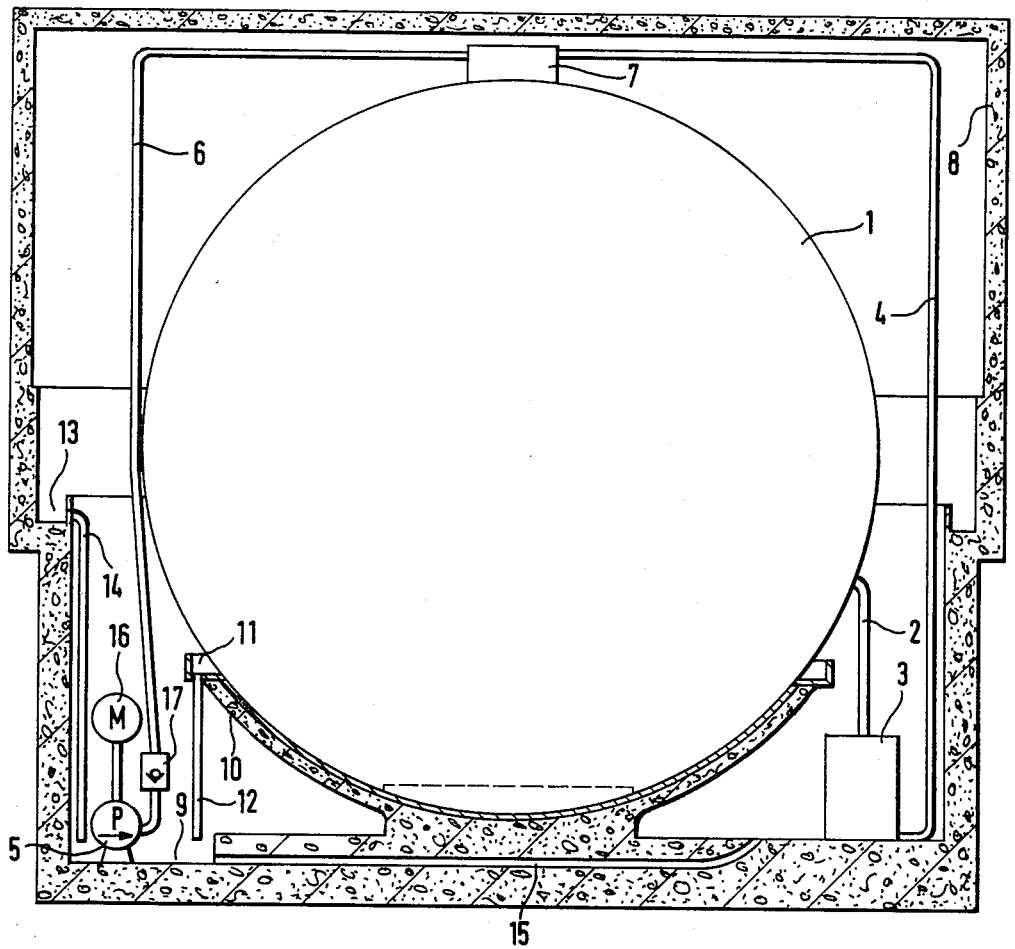

COOLANT STANDPIPE SYSTEM FOR PROTECTION OF A NUCLEAR REACTORS SAFETY VESSEL AGAINST BREAKDOWN FROM OVERPRESSURE

The invention concerns the protection against destructive overpressure of a nuclear reactor safety vessel in an installation in which there is also a supplementary safety enclosure, such as is commonly provided for below-ground nuclear power reactors.

It is known from German published application DE-OS No. 27 10 290 to provide mechanical safety valves to protect the safety vessel of a nuclear power reactor against overpressure. The function of such a safety valve consists in preventing the safety vessel from being subjected to a pressure in excess of the design pressure without leading to a pressure equalization between the interior of the safety vessel and the remaining volume within the exterior safety enclosure. The objective thus to be reached is that in the event of a major accident, an overflow connection between the safety vessel and the outer safety enclosure is provided only for limiting the overpressure in the safety vessel, in order to hold back in the safety vessel the largest possible portion of the radioactivity. The basic consideration is that the less radioactivity reaches the intermediate region enclosed by the safety enclosure, the longer the response of the safety valve is delayed and the smaller is the aggregate overflow gas quantity.

In the known system, more safety valves must be provided for safety reasons than are required strictly for performing the protective function against overpressure. In spite of this safety precaution, the possibility cannot be fully excluded that as the result of the disabling of all valves the protective function will not be performed in the case of a major accident. Furthermore, when several safety valves are arranged in parallel, the probability is increased that a complete pressure equalization between the safety vessel and the supplementary safety enclosure will take place when the valves operate. As a result, a large part of the gas-carried radioactivity present in the safety vessel will escape into the outer portion of the installation confined by the safety enclosure and produce a substantial widening of the accident damage. In addition, in the case of a pressure equalization between the safety vessel and the outer safety enclosure their aggregate storage capacity for gases is substantially reduced because of the lower absolute pressure in the safety vessel.

SUMMARY OF THE INVENTION

It is an object of the present invention to avoid the above-mentioned disadvantages and to secure the safety vessel of a nuclear reactor reliably against overpressure without the risk of a premature issuance of radioactivity into the region confined only by the outer safety enclosure.

Briefly, a liquid-storage vessel is connected by a pressure balance line to the interior space of the safety vessel and a standpipe is connected to the liquid-storage vessel. The latter is preferably located between the safety vessel and the safety enclosure. By this arrangement, undesired pressure increases in the interior of the safety vessel can be absorbed.

In a particularly advantageous embodiment of the invention, the standpipe or riser connected to the liquid-storage vessel has a discharge above the safety vessel, but still within the safety enclosure. If the pressure in the safety vessel exceeds the value that corresponds to the liquid density and the height difference between the discharge orifice of the standpipe and the level of the liquid-storage vessel, liquid flow cooling comes into operation and provides for cooling down the safety vessel, thereby producing a corresponding pressure drop.

A particularly uniform distribution of the liquid flowing out in such a case from the standpipe is obtained when the standpipe discharges into an overflow collar that is appropriately located at the highest point of the safety vessel. Of course, other locations for the overflow collar are possible, so long as a uniform distribution of the liquid over the surface of the safety vessel is obtained. It must be assured, however, that the liquid can flow back into the liquid-storage vessel when the pressure in the safety vessel drops as a result of sufficient cooling. According to a further feature of the invention, therefore, it is provided that a sump pump should be located on the bottom of the safety enclosure with its pressure line discharging above the safety vessel. By this arrangement, the liquid that may drop to the bottom of the safety enclosure is pumped back up to the region above the safety container, so that it can then be used again for cooling of the safety vessel. Only when the entire supply of liquid has been used up by vaporization or when the pressure in the safety vessel in spite of cooling continues to rise, is the liquid-storage container ultimately fully emptied. The liquid-storage container is so dimensioned that enough liquid is available for heat transfer from the safety vessel to the internal structure of the safety enclosure. Even upon complete vaporization of the liquid the design pressure of the safety enclosure should not be exceeded.

When an overflow collar is provided for the distribution of the liquid coming out of the liquid-storage vessel, the pressure line of the sump pump should likewise discharge into the overflow collar. It is desirable for both the pressure line of the sump pump and the discharge of the standpipe to have their discharge orifices below the overflow liquid level in the collar. In that manner, it is assumed that when the temperature goes back down practically the entire quantity of liquid can be pumped back into the liquid-storage vessel.

A sprinkler cooling system for the pressure vessel can be completely dispensed with in the design and operation of an installation equipped in accordance with the present invention. The provision of a supplemental sprinkler system connected to the overflow collar is not, however, excluded and may be useful in some cases.

In order that all of the liquid issuing out of the standpipe, even after vaporization and condensation, should reach the region of the suction pump, it is provided as a further feature of the invention that the interior walls of the safety enclosure should be provided with condensate-catching gutters, from which piping should lead to the region of the suction pump. Likewise, the outside of the safety container should be provided in a slower portion with a gutter, from which also piping should lead to the neighborhood of the suction pump. Finally, the bottom of the safety enclosure should preferably also have channels leading to the suction pump.

The liquid-storage vessel preferably contains a cooling liquid having a low vaporization temperature, in order to make possible the use of the heat of vaporization of the liquid.

The apparatus of the invention fulfills with almost absolute safety the function of overpressure protection necessary for nuclear power stations. A liquid level in the liquid-storage vessel that is either too high or too low has only a small influence on the response threshold of the safety system. The braking of piping joints can at most lead to pressure equalization between the safety vessel and the second enclosure, but basically does not prevent the operation of the protective function for overpressure security. It is advantageous, moreover, that in proper operation of the apparatus larger quantities of radioactivity reach the supplementary safety enclosure only when the heat capacity of the safety enclosure is exhausted. In normal operation, this is the case only after several days.

THE DRAWING

The invention is further described by way of illustrative example with reference to the annexed drawing, the single FIGURE of which is a diagrammatical vertical section of a nuclear power reactor having a spherical safety vessel 1 and a safety enclosure 8 surrounding the latter.

DESCRIPTION OF THE ILLUSTRATED EMBODIMENT

The interior space of the safety vessel 1 is connected by means of a pressure equalization line 2 with a liquid-storage tank 3. To the latter a standpipe 4 is connected. As soon as an overpressure builds up in the safety vessel 1 with respect to the safety enclosure 8, the liquid rises in the standpipe 4 in manometer fashion up to the point that the height of the liquid column corresponds to the overpressure in the safety vessel.

The standpipe 4 discharges into the interior of an overflow collar 7 disposed on the top of the safety vessel 1. Liquid transported up through the standpipe 4 to the collar 7 by the overpressure is uniformly distributed by the collar 7 over the outer surface of the safety vessel 1. With sufficiently high temperature, vapor is formed which is condensed on the inner surface of the safety enclosure 8 and thereby transfers a part of the heat generated in the safety vessel 1.

The condensate runs down together with the excess liquid to the sump 9 at the bottom of the safety enclosure 8. A sump pump 5 is located there and is driven by a motor 16. It pumps the liquid through a pressure line 6 equipped with a check valve 17, back to the overflow collar 7. If the overpressure drops down again by the exterior cooling of the safety vessel 1, a part of the liquid discharged by the sump pump 5 flows back into the liquid storage tank 3. Only if all the liquid is vaporized or if the pressure in the safety vessel 1 continues to rise in spite of the cooling of the outer surface, is there finally complete relief of the pressure of the safety vessel 1 into the safety enclosure 8.

The safety vessel 1 is provided with an encircling steel collar 11 at the lip of the concrete pedestal shell that carries the safety vessel. The collar 11 catches the unvaporized liquid (which may be water) that trickles down on the outside of the safety vessel 1 and enables it to be led through the piping 12 directly to the sump 9. For draining the condensate produced by the vaporized liquid, there are provided condensate gutters 13 on the interior side of the safety enclosure 8. These are conveniently located at the respective deepest locations of the structure reached by vapor and condensate. The condensed liquid then proceeds through piping 14 from the condensate gutters 13 down to the sump 9. The bottom of the safety enclosure 8 serves also as a heat sink by means of the provision of connection channels or ducts 15 provided for leading the condensed liquid through the concrete structure to the sump 9.

The apparatus of the invention lends itself well to installation in all nuclear power works that are equipped with a second enclosure or safety enclosure surrounding the safety vessel 1. Instead of the liquid-storage vessel, a water reservoir can also be used for normal overpressure protection. This water reservoir can then, according to the invention, be used at the same time for cooling of the safety vessel. The pumps for use in accordance with the invention as above described must be suitable for maintaining a water vapor circulation in the safety enclosure. In that manner, the heat transfer from the safety vessel to the structure of the supplementary safety enclosure can be facilitated in a practical manner.

Although the invention has been described with reference to a particular illustrative example, it will be understood that variations and modifications are possible within the inventive concept.

We claim:

1. Apparatus for overpressure protection of the safety vessel of a nuclear reactor equipped with a supplementary safety enclosure outside the safety vessel, comprising:

a storage vessel (3) for storing a liquid;

a pressure equilibrium pipe connection (2) providing at all times an unobstructed path between the interior of said safety vessel (1) and said liquid-storage vessel, and a standpipe (4) having its dicharge above and outside of said safety vessel (1) and within said supplementary safety enclosure (8), said discharge being also located higher than said storage vessel, said standpipe (4) providing at all times an unobstructed path between said storage vessel and said discharge and being so connected to said storage vessel (3) that when overpressure is produced within said safety vessel (1) pressure communicated to said storage vessel (3) through said equilibrium pipe (2) forces said liquid stored in said storage vessel (3) into and up said standpipe (4) and ultimately out of said standpipe discharge onto the outer surface of said safety vessel (1).

2. Apparatus as defined in claim 1, in which said liquid-storage vessel (3) is located within said supplementary safety enclosure (8).

3. Apparatus as defined in claim 1, in which said liquid-storage vessel contains a cooling liquid of low vaporization point.

4. Apparatus as defined in claim 1, in which said discharge orifice of said standpipe (4) leads into an overflow collar (7) located for distributing overflow over the exterior of said safety vessel.

5. Apparatus as defined in claim 4, in which a sump pump (5) is provided on the bottom of said supplementary safety enclosure (8) and is equipped with a pressure-side discharge line (6) arranged to discharge above said safety vessel (1).

6. Apparatus for overpressure protection of the safety vessel of a nuclear reactor equipped with a supplementary safety enclosure outside the safety vessel, comprising:

an overflow collar (7) on the outside of said safety vessel (7) located for distributing liquid overflow from said collar outward over the exterior of said safety vessel;

a storage vessel (3) for storing a liquid;

a pressure equilibrium pipe connection (2) between the interior of said safety vessel (1) and said liquid-storage vessel, a standpipe (4) having its discharge above said safety vessel (1), within said supplementary safety enclosure (8) and leading into said overflow collar (7), said standpipe (4) being so connected to said storage vessel (3) that when overpressure is produced within said safety vessel (1) pressure communicated to said storage vessel (3) through said equilibrium pipe (2) forces said liquid stored in said storage vessel (3) into and up said standpipe (4), and a sump pump (5), on the bottom of said supplementary safety enclosure (8), equipped with a pressure-side discharge line (6) arranged to discharge above safety vessel (1), said pressure discharge line (6) of said sump pump (5) being disposed so as to discharge into said overflow collar (7).

7. Apparatus as defined in claim 6, in which the respective discharge orifices of said sump pump discharge line (6) and of said standpipe (4) are located below the liquid overflow level in said collar (7).

8. Apparatus as defined in claim 7, in which said supplementary safety enclosure (8) has inner wall surfaces equipped with condensate catching gutters (13) which are provided with pipes (14) leading to the neighborhood of said sump pump (5).

9. Apparatus as defined in claim 8, in which the exterior of said safety vessel (1) is equipped in its lower portion with a gutter (11) and with pipes (18) leading from said gutter to the neighborhood of said sump pump (5).

10. Apparatus as defined in claim 9, in which the bottom of said supplementary safety enclosure (8) is equipped with drain tunnels (15) leading to said sump pump (5).

11. Apparatus as defined in claim 6, in which said liquid-storage vessel contains a cooling liquid of low vaporization point.

* * * * *